(12) United States Patent
Terazawa et al.

(10) Patent No.: US 8,627,942 B2
(45) Date of Patent: Jan. 14, 2014

(54) SYSTEM AND METHOD FOR SYNCHRONOUSLY CONVEYING UNDERBODY COMPONENTS FOR VEHICLE BODY

(75) Inventors: Yoshihiko Terazawa, Tsu (JP); Yoshikazu Shimizu, Suzuka (JP); Akira Minamikawa, Suzuka (JP); Masanao Iwasaki, Suzuka (JP); Yuichi Yoshida, Suzuka (JP)

(73) Assignee: Honda Motor Co., Ltd., Tokyo (JP)

( * ) Notice: Subject to any disclaimer, the term of this patent is extended or adjusted under 35 U.S.C. 154(b) by 547 days.

(21) Appl. No.: 12/994,046

(22) PCT Filed: May 22, 2009

(86) PCT No.: PCT/JP2009/059424
§ 371 (c)(1),
(2), (4) Date: Nov. 22, 2010

(87) PCT Pub. No.: WO2009/142293
PCT Pub. Date: Nov. 26, 2009

(65) Prior Publication Data
US 2011/0094855 A1    Apr. 28, 2011

(30) Foreign Application Priority Data
May 23, 2008  (JP) ............... P2008-135524

(51) Int. Cl.
*B65G 47/26*  (2006.01)
*B65G 47/08*  (2006.01)
*B65G 35/06*  (2006.01)

(52) U.S. Cl.
CPC .............. *B65G 47/088* (2013.01); *B65G 35/06* (2013.01)

USPC ...................... 198/434; 198/465.1; 104/172.2

(58) Field of Classification Search
USPC ............. 198/345.1, 345.2, 345.3, 434, 465.1, 198/465.2, 465.3, 465.4; 104/172.1, 172.2, 104/172.3, 172.5
See application file for complete search history.

(56) References Cited

U.S. PATENT DOCUMENTS

| | | | | |
|---|---|---|---|---|
| 3,478,698 | A * | 11/1969 | Jones | .............. 104/172.2 |
| 4,894,909 | A | 1/1990 | Sakamoto et al. | |
| 6,170,650 | B1 * | 1/2001 | Morikiyo et al. | ........ 198/867.14 |
| 6,226,848 | B1 * | 5/2001 | Kurtz | .............. 29/407.01 |
| 6,814,218 | B2 * | 11/2004 | Nishihara | .............. 198/465.1 |
| 7,127,997 | B2 * | 10/2006 | Nishihara et al. | ............... 104/89 |
| 7,201,105 | B2 * | 4/2007 | Nishihara et al. | .......... 104/172.3 |
| 2004/0216985 | A1 | 11/2004 | Nishihara et al. | |

FOREIGN PATENT DOCUMENTS

| | | |
|---|---|---|
| CN | 1370724 A | 9/2002 |
| CN | 1410328 A | 4/2003 |
| EP | 0 751 061 A1 | 1/1997 |
| JP | 56-103665 A | 8/1981 |
| JP | 10-236641 A | 9/1998 |
| JP | 2004-331245 A | 11/2004 |

* cited by examiner

*Primary Examiner* — William R Harp
(74) *Attorney, Agent, or Firm* — Birch, Stewart, Kolasch & Birch, LLP

(57) ABSTRACT

A synchronized carrying system comprising: an overhead conveyor which transports a vehicle body; a floor-side conveyor which transports an underbody part; a control device which operates and controls the overhead conveyor and the floor-side conveyor; and a carrying device on which the underbody part is mounted, wherein the synchronized carrying system synchronizes the overhead conveyor and the floor-side conveyor during a process that loads the underbody part to the vehicle body.

4 Claims, 6 Drawing Sheets

SYSTEM AND METHOD FOR SYNCHRONOUSLY CONVEYING UNDERBODY COMPONENTS FOR VEHICLE BODY

TECHNICAL FIELD

The present invention relates to a synchronized carrying system and a synchronized carrying method involving an operation of loading underbody parts to a vehicle body.

The present application claims priority on Japanese Patent Application No. 2008-135524, filed May 23, 2008, the content of which is incorporated herein by reference.

BACKGROUND ART

There have been various processes of assembling a vehicle body of an automobile, in which the vehicle body is carried while being mounted on an overhead conveyor, and underbody parts such as an engine mission assembly or a suspension assembly are loaded to the vehicle body. Among such processes, there is a process that uses a slat conveyor, which is placed on the factory floor so that the slat conveyor is aligned parallel to the direction of the work flow, transports a carriage carrying the underbody parts along with a vehicle body that is transported by an overhead conveyor, and elevates this carriage and the underbody parts at a predetermined location to load the underbody parts to the vehicle body (for example, refer to Patent Document 1). The slat conveyor is supported by a base frame placed in an underground pit beneath the factory floor. A carriage returning device is placed within the underground pit. This carriage returning device lowers the carriage, which has reached a downstream side of the slat conveyor, to a location below the factory floor. Further, this carriage returning device transports the carriage to an upstream side via an underground space below the slat conveyor, and elevates the carriage again above the factory floor.

In addition, Patent Document 1 discloses a synchronized transportation device that changes the position of a carriage with respect to a slat conveyor according to the type of vehicle (wheel base). This change in the positioning of the carriage is made based on a vehicle body that is placed on an overhead conveyor which is synchronized with the slat conveyor. Further, the synchronized transportation device according to Patent Document 1 aims to change the position at which underbody parts are loaded to the vehicle body based on the type of the vehicle.

More specifically, the above synchronized transportation device includes a frame and a dog affixed to the slat conveyor, multiple start signaling switches which operate based on the dog and correspond to the vehicle types, a clamp unit which is placed on the carriage and clamps certain places of the frame, a carriage stopper device which can stop the transportation of the carriage by the slat conveyor, and an upper level computer that transmits data of vehicle types. Each of the start signaling switches can detect the dog. However, based on the data of vehicle types transmitted from the upper level computer, only the start signaling switch which corresponds to a particular vehicle type will detect the dog. At this time, the clamp unit placed on both sides of the carriage clamps the frame placed on both sides of the slat conveyor. Further, when the start signaling switch which corresponds to the particular vehicle type detects the dog while the carriage is being stopped by the carriage stopper device, each clamp unit on the carriage clamps each frame on the slat conveyor. At the same time, the carriage, which had been halted by the carriage stopper device, starts moving. Thus, the carriage and the underbody parts are transported by the slat conveyor while being positioned according to vehicle type at a certain position with respect to the vehicle body placed on the overhead conveyor.

PRIOR ART DOCUMENT

Patent Document

[Patent Document 1] Japanese Unexamined Patent Application, First Publication No. Hei 10-236641

DISCLOSURE OF INVENTION

Problems to be Solved by the Invention

However, according to the conventional configuration disclosed above, the carriage is elevated and lowered using an underground pit and a comparatively large-scale carriage returning device. As a result, the installation costs and the operating costs of the device have been increasing.

Furthermore, the positioning of the start signaling switch and the number of the start signaling switch had to be changed every time the type of vehicle transported by the underbody part assembling process changed or increased. Thus, the conventional configuration was complicated and cumbersome. In addition, a pair of frames must be installed on the slat conveyor for each carriage. At the same time, a pair of clamp units must be installed on the carriage as well. Consequently, the configuration described above was costly.

Accordingly, an object of the present invention is to provide a synchronized carrying device and a synchronized carrying method for underbody parts of a vehicle body that can lower the installation cost and the operation cost of the device. At the same time, the present invention aims to reduce the complexity associated with the change in vehicle types, and also aims to reduce costs.

Means for Solving the Problems

In order to achieve the above object, the present invention employs the following.

Namely, a synchronized carrying system for an underbody part of a vehicle body according to an aspect of the present invention is a synchronized carrying system including: an overhead conveyor which transports a vehicle body; a floor-side conveyor which transports an underbody part; a control device which operates and controls the overhead conveyor and the floor-side conveyor; and a carrying device on which the underbody part is mounted, wherein: the overhead conveyor and the floor-side conveyor are in synchrony when the underbody part is loaded to the vehicle body; the floor-side conveyor has a primary line portion which is parallel to the direction of a work transportation of the overhead conveyor, a main route which is placed along a factory floor plane, and a floor-side chain conveyor and a friction conveyor which transports the carrying device along the main route; the floor-side chain conveyor has a secondary line portion which is parallel to the main line portion of the main route, a secondary route which is placed along the factory floor plane, and an engaging part which engages with the carrying device that moves along the secondary route; the friction conveyor has a return part which connects a start point and an end point of the main line portion of the main route, and multiple friction rollers which are placed on the return part; the friction rollers can operate individually and move the carrying device by coming into contact with the carrying device; and the control device controls the floor-side chain conveyor and the overhead conveyor in synchrony, controls the friction conveyor so that the carrying device stops and moves at a predetermined velocity at a predetermined location on the return part, drives the friction roller placed in an upstream side of the start point of the main line portion and sends out the carrying device to the main line portion when the carrying device stopped in the upstream side of the start point of the main line portion of the return part engages with the engaging part of the floor-side chain conveyor which is in synchrony with the overhead conveyor, moves the carrying device engaged with the engaging part to the end point of the main line portion, and leads the carrying device to the return part by driving the friction roller placed in a downstream side of the end point of the main line portion of the return part when the carrying device disengages from the engaging part at the end point of the main line portion.

In addition, the synchronized carrying system according to the aspect of the present invention may be configured as follows: the carrying device has a base which loads the underbody part to a predetermined position, a trunnion pin which sticks out from below the base and engages with the main route to move along the main route, a phase switching unit which is placed on the base and changes a position of the trunnion pin with respect to the base in a direction of the work transportation, multiple node parts which are connected to each other through multiple pins including the trunnion pin, a receiving unit which includes continuous planes of the respective node parts and receives a driving force of the friction roller by coming into contact with the friction roller, and multiple trolleys each of which are rotatably supported by the respective pins; and a passive projection is placed on the respective trolleys rotatably supported by the respective pins, the passive projection engaging with the engaging part of the floor-side chain conveyor.

On the other hand, a synchronized carrying method for an underbody part of a vehicle body according to an aspect of the present invention includes: an overhead conveyor which transports a vehicle body; and a floor-side conveyor which transports an underbody part, wherein: the synchronized carrying method synchronizes the overhead conveyor and the floor-side conveyor when the underbody part is loaded to the vehicle body; the floor-side conveyor has a main line portion which is parallel to a direction of a work transportation of the overhead conveyor, a main route which is placed along a factory floor plane, and a floor-side chain conveyor and a friction conveyor which moves a carrying device carrying the underbody part along the main route; the floor-side chain conveyor has a secondary line part which is parallel to the main line part of the main route, a secondary route which is placed along the factory floor plane, and an engaging part which engages with the carrying device that moves along the secondary route; the friction conveyor has a return part which connects a start point and an end point of the main line portion of the main route, and multiple friction rollers which are placed on the return part; the friction rollers can operate individually and move the carrying device by coming into contact with the carrying device; and the control device controls the floor-side chain conveyor and the overhead conveyor in synchrony, controls the friction conveyor so that the carrying device stops and moves at a predetermined velocity at a predetermined location on the return part, drives the friction roller placed in an upstream side of the start point of the main line portion and sends out the carrying device to the main line portion when the carrying device stopped in the upstream side of the start point of the main line portion of the return part engages with the engaging part of the floor-side chain conveyor which is in synchrony with the overhead conveyor, moves the carrying device engaged with the engaging part to the end point of the main line portion, and leads the carrying device to the return part by driving the friction roller placed in a downstream side of the end point of the main line portion of the return part when the carrying device disengages from the engaging part at the end point of the main line portion.

Effects of the Invention

Based on the synchronized carrying system and the synchronized carrying method described above, the carrying device (carriage) circulates along a main route on the factory floor during the process of loading underbody parts transported by the floor-side conveyor to the vehicle body transported by the overhead conveyor. In addition, this carriage engages with the engaging unit that circulates along a secondary route along the factory floor. The engaging of the carriage takes place at a main line portion of the main route. Thus, it is possible to transport the overhead conveyor, which carries the vehicle body, along with the carriage, which carries the underbody parts. At the same time, the present invention can reduce the installation cost and the operating cost of the device compared to a process that uses a large-scale carriage returning device to elevate and lower the carriage with respect to the underground pit.

In addition, based on the synchronized carrying system described above, when the carrying device engages with the engaging unit of the floor-side chain conveyor operating in synchrony with the overhead conveyor, the positions of the underbody parts are altered in the direction of the work transportation with respect to the engaging unit of the trunnion pin and the floor-side chain conveyor. The underbody parts are placed on a predetermined location on a base of the carrying device. Based to the synchronized carrying method according to the aspect of the present invention described above, the position at which the underbody parts are loaded to the vehicle body can be changed according to the type of vehicle. At the same time, according to the synchronized carrying method described above, the phase switching unit placed on the base completes changing the respective positioning of the base and the trunnion pin. Therefore, it is possible to reduce the complexity and cost associated with dealing with the change in vehicle type.

BEST MODE FOR CARRYING OUT THE INVENTION

First Embodiment

Figure 1:
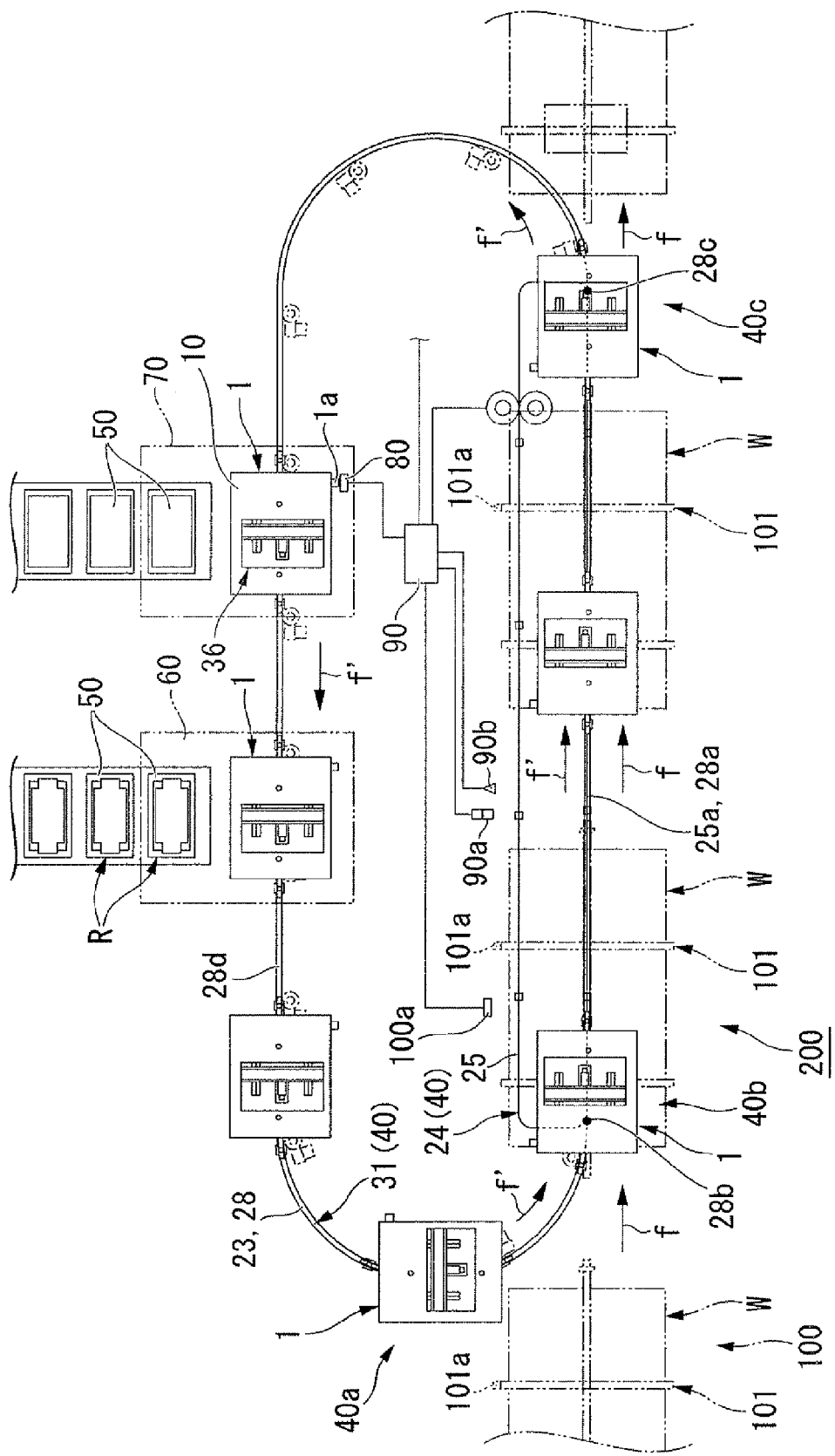
FIG. 1 is a top view showing a synchronized carrying device according to an embodiment of the present invention.
Figure 2:
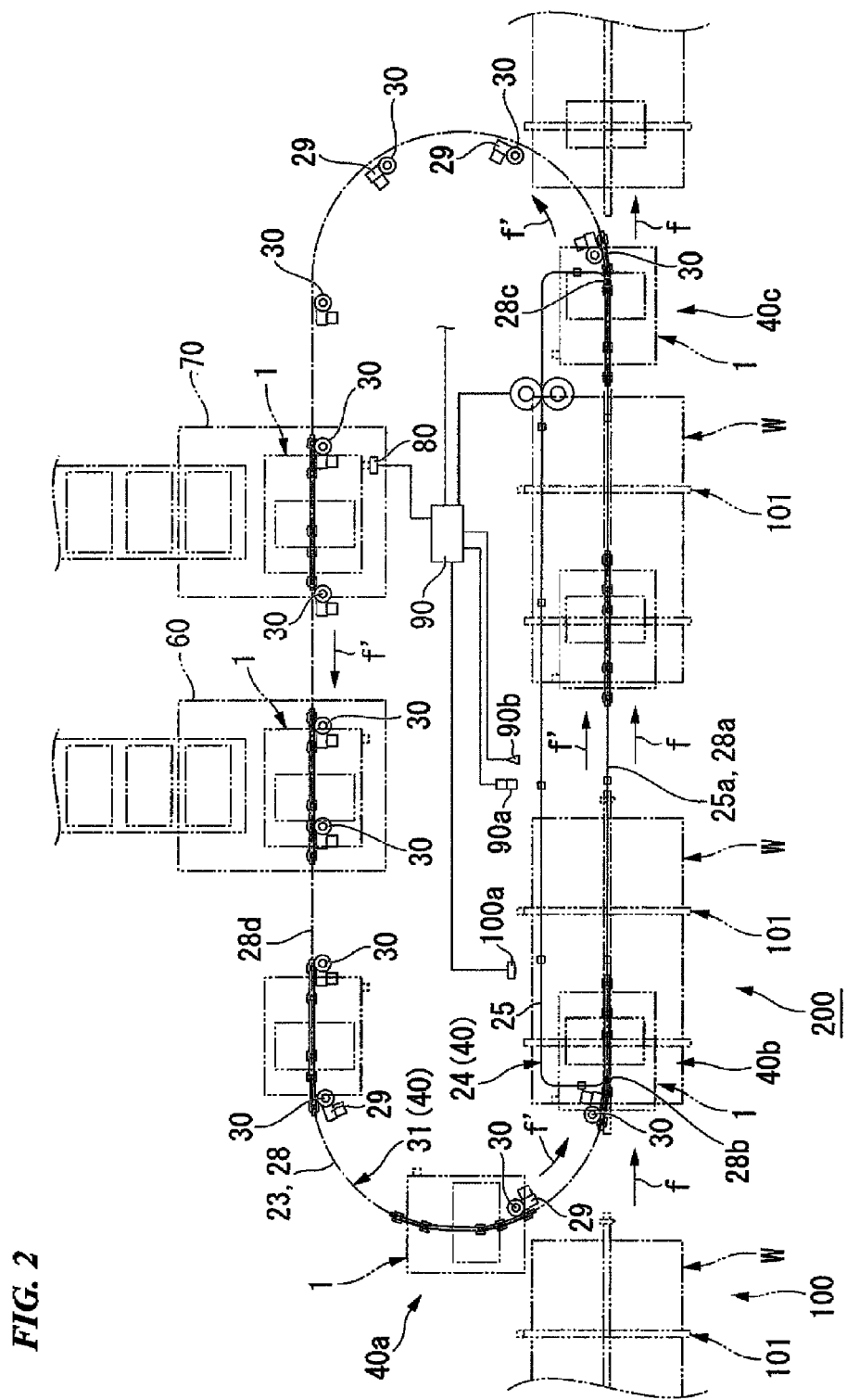
FIG. 2 is a top view primarily showing an area beneath a factory floor of the synchronized carrying device according to the embodiment.
Figure 3:
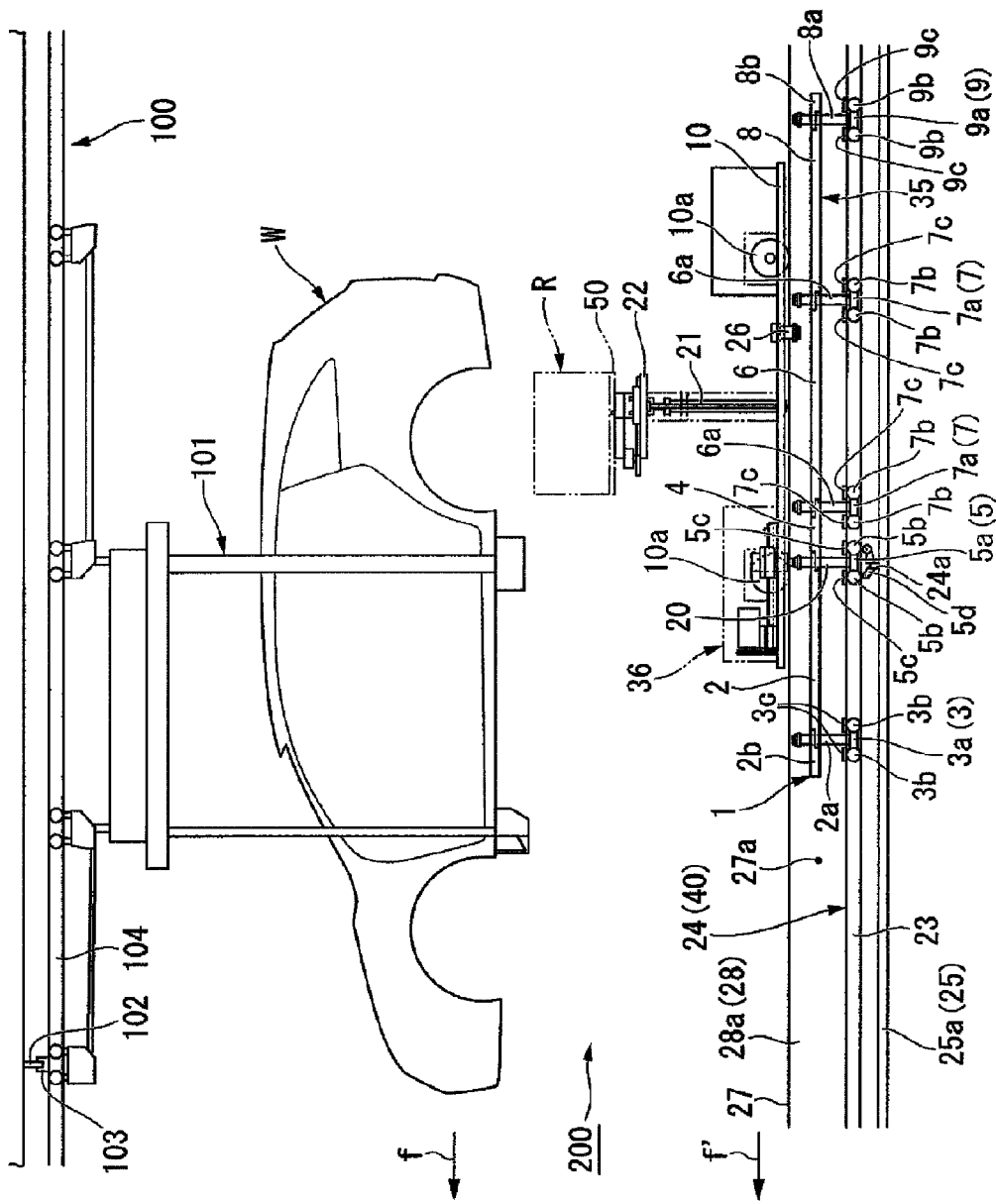
FIG. 3 is a side view of a main portion of the synchronized carrying device according to the embodiment.

Hereunder, an embodiment of a synchronized carrying system and a synchronized carrying method according to the present invention is described with reference to the drawings. FIGS. 1-3 show a synchronized carrying device that is used while assembling a vehicle body of a vehicle in order to load a rear suspension assembly R (underbody part) to a vehicle body W which is transported on an overhead conveyor 100.

The overhead conveyor 100 makes a hanger 101 move along a guide rail 104. The hanger 101 includes a drive projection 102 which engages with a passive projection 103. A carriage 1 moves along a floor-side conveyor 40 which is placed on the factory floor (floor). The carriage 1 carries the rear suspension assembly R. A control device 90 operates and controls the overhead conveyor 100 and the floor-side conveyor 40.

According to the rear suspension assembly loading process 200, the overhead conveyor 100 is synchronized with the floor-side conveyor 40, and the conveyors transport the vehicle body W and the rear suspension assembly R. In addition, it is possible to elevate the rear suspension assembly R at a predetermined location and load the rear suspension assembly R to the vehicle body W. According to the rear suspension assembly loading process 200, the overhead conveyor 100 transports the vehicle body W along a substantially horizontal line. An arrow f shows the direction of the work transportation of the overhead conveyor 100. An arrow f' shows the direction of the work transportation of the floor-side conveyor 40.

The floor-side conveyor 40 includes a slit 28, a floor-side chain conveyor 24, and a friction conveyor 31. The slit 28 is formed on a factory floor 27. This slit 28 includes a main line portion 28a which is linear. The direction of the work transportation of the main line portion 28a is parallel to that of the overhead conveyor 100 (the two roughly overlap from a top view). The floor-side chain conveyor 24 makes the carriage 1 move along the slit 28 so that the carriage 1 can transport the rear suspension assembly R.

From a top view, the slit 28 forms a loop-shaped transportation route in the form of a long ellipse along the direction of the work transportation of the overhead conveyor 100. Hereinafter, a portion of the slit 28 excluding the main line portion 28a is referred to as a return portion 28d. This return portion 28d runs from an end point 28c of the main line portion 28a to a start point 28b. Multiple friction rollers 30 are placed on appropriate parts of the return portion 28d. These friction rollers 30 are operated and controlled by the control device 90 so that the carriage 1 can stop and move at a predetermined velocity. The loading of the rear suspension assembly is performed between the starting point 28b of the main line portion 28a and the end point 28c.

The floor-side chain conveyor 24 includes a secondary line portion 25a, a guide rail 25, and a drive projection 24a. The secondary line portion 25a is linear and is parallel to the main line portion 28a of the slit 28. The guide rail 25 is placed along the factory floor 27. The drive projection 24a faces the carriage 1 which moves along the guide rail 25. The control device 90 operates and controls the floor-side chain conveyor 24 and the overheard conveyor 100 so that the two conveyors are in synchrony with each other.

The guide rail 25 forms a loop-shaped transportation route which is elongated along the overhead conveyor 100 from a top view. The guide rail 25 is placed in the inner side of the slit 28 excluding the secondary line portion 25a from a top view. The perimeter of the guide rail 25 is shorter than the perimeter of the slit 28. The guide rail 25 is placed in the bottom part of a small space 27a below the slit 28 (below the factory floor).

The friction conveyor 31 includes the return portion 28d and each friction roller 30. Each of the friction rollers 30 includes a drive mechanism 29 which operates electrically. The control device 90 drives and controls each of the drive mechanisms 29 individually. Because each of the friction rollers 30 comes in frictional contact with the receiving unit 35 of the carriage 1, the carriage 1 moves or stops.

Next, the synchronized carrying system and the synchronized carrying method according to the above embodiment of the present invention are described with reference to FIG. 3. The carriage 1 transports the rear suspension assembly R by placing the rear suspension assembly R on the base 10 at a predetermined location. The carriage 1 includes a front pin 2a which extends in the upper and lower directions. The front pin 2a is placed on the front end of a first node part 2 which extends roughly horizontally within the small space 27a beneath the base 10 (beneath the factory floor). A main body part 3a of a front trolley 3 is rotatably pivoted on the lower end of the front pin 2a. At the rear end of the first node part 2, a second node part 4 is connected by a trunnion pin 20 which is placed on the front end of the second node part 4 and extends in the upper and lower directions. The second node part 4 is connected to the first node part 2 so that the second node part 4 can oscillate. A main body part 5a of a passive trolley 5 is rotatably pivoted on the lower end of the trunnion pin 20. At the rear end of the second node part 4, a third node part 6 is connected by a connection pin 6a which is placed on the front end of the third node part 6 and extends in the upper and lower directions. The third node part 6 is connected to the second node part 4 so that the third node part 6 can oscillate. A main body part 7a of a load trolley 7 is rotatably pivoted on the lower end of the connection pin 6a. At the rear end of the third node part 6, a fourth node part 8 is connected by a connection pin 6a which is placed on the front end of the fourth node part 8 and extends in the upper and lower directions. The fourth node part 8 is connected to the third node part 6 so that the fourth node part 8 can oscillate. As described above, the main body part 7a of the load trolley 7 is rotatably pivoted on the lower end of the connection pin 6a. A rear pin 8a is placed at the rear end of the fourth node part 8. The rear pin 8a extends in the upper and lower directions. A main body part 9a of a rear trolley 9 is rotatably pivoted on the lower end of the rear pin 8a.

The front trolley 3 includes the main body part 3a, a trolley wheel 3b, and a guide roller 3c. The trolley wheel 3b is pivotally supported along both the front and rear sides of the main body part 3a. The guide roller 3c is pivotally supported along the upper side of the main body part 3a. A front node part 2b is fixed on the front pin 2a so that the front node part 2b faces the direction in which the front pin 2a rotates.

The passive trolley 5 includes the main body part 5a, a trolley wheel 5b, a guide roller 5c, and a passive projection 5d. The trolley wheel 5b is pivotally supported along both the front and rear sides of the main body part 5a. The guide roller 5c is pivotally supported along the upper side of the main body part 5a. The passive projection 5d is retractably placed in the lower portion of the main body part 5a.

Each of the load trolleys 7 includes the main body part 7a, a trolley wheel 7b, and a guide roller 7c. The trolley wheel 7b is pivotally supported along both the front and rear sides of the main body part 7a. The guide roller 7c is pivotally supported along the upper side of the main body part 7a.

The rear trolley 9 includes the main body part 9a, a trolley wheel 9b, and a guide roller 9c. The trolley wheel 9b is pivotally supported along both the front and rear sides of the main body part 9a. The guide roller 9c is pivotally supported along the upper side of the main body part 9a. A tail node part 8b is fixed to the rear pin 8a so that the tail node part 8b faces the direction in which the rear pin 8a rotates.

The side surfaces of each of the node parts 2, 2b, 4, 6, 8, and 8b are positioned so that the side surfaces form a single continuous plane. The side surfaces of these node parts 2, 2b, 4, 6, 8, and 8b are configured to be a receiving part 35 of the friction roller 30.

Figure 4:
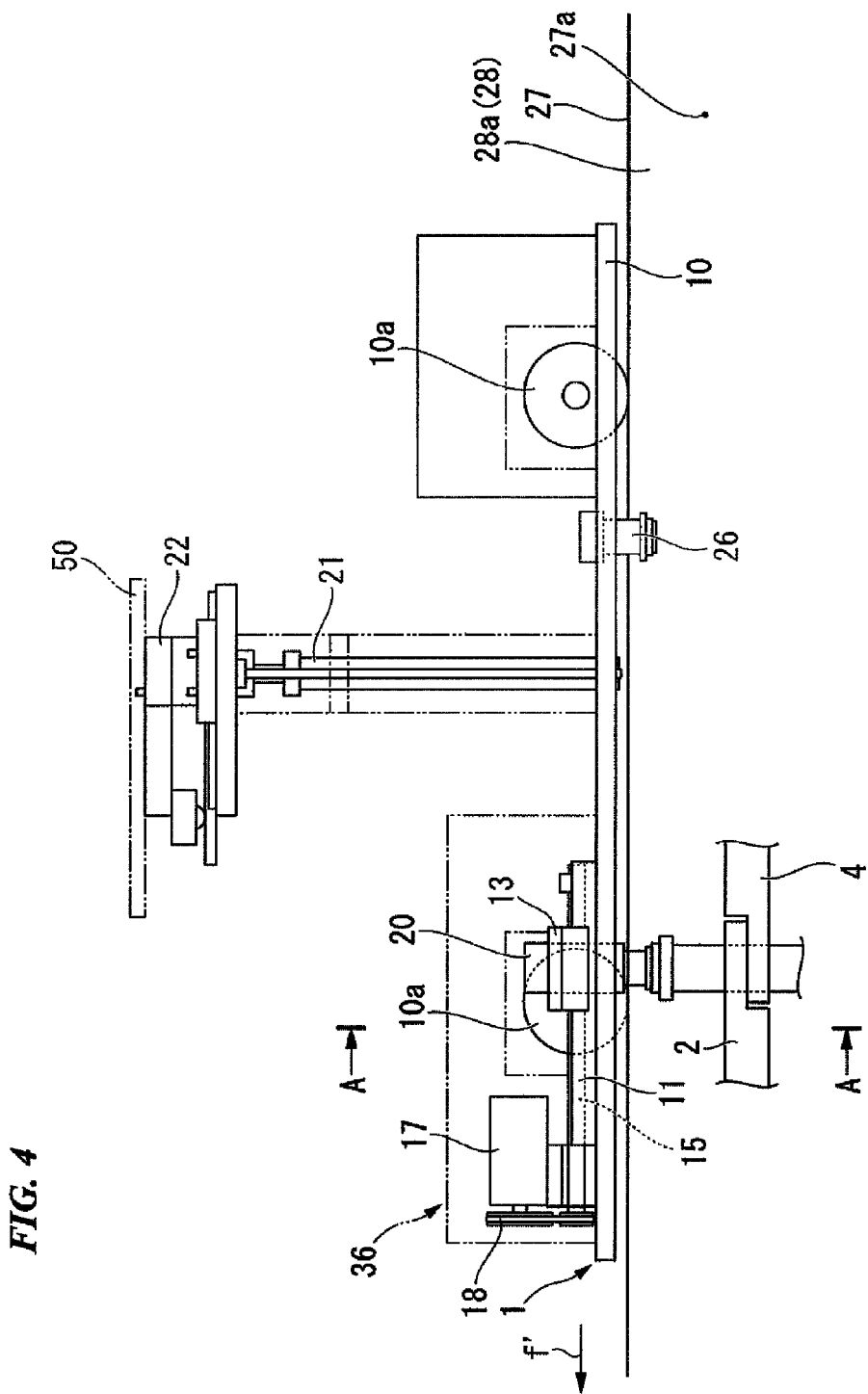
FIG. 4 is a side view primarily showing an area above the factory floor of a carriage of the synchronized carrying device according to the embodiment.
Figure 5:
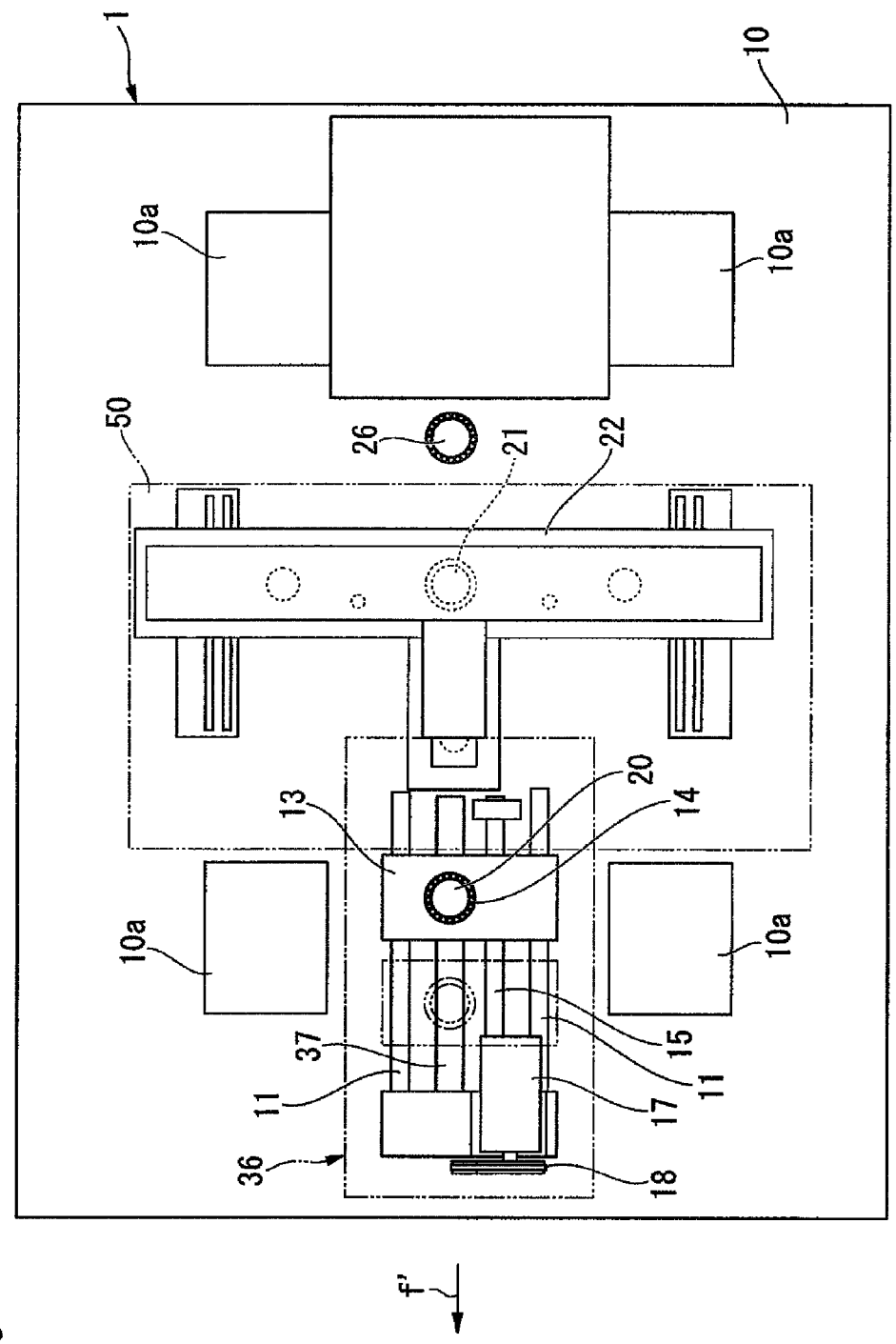
FIG. 5 is a top view of FIG. 4.
Figure 6:
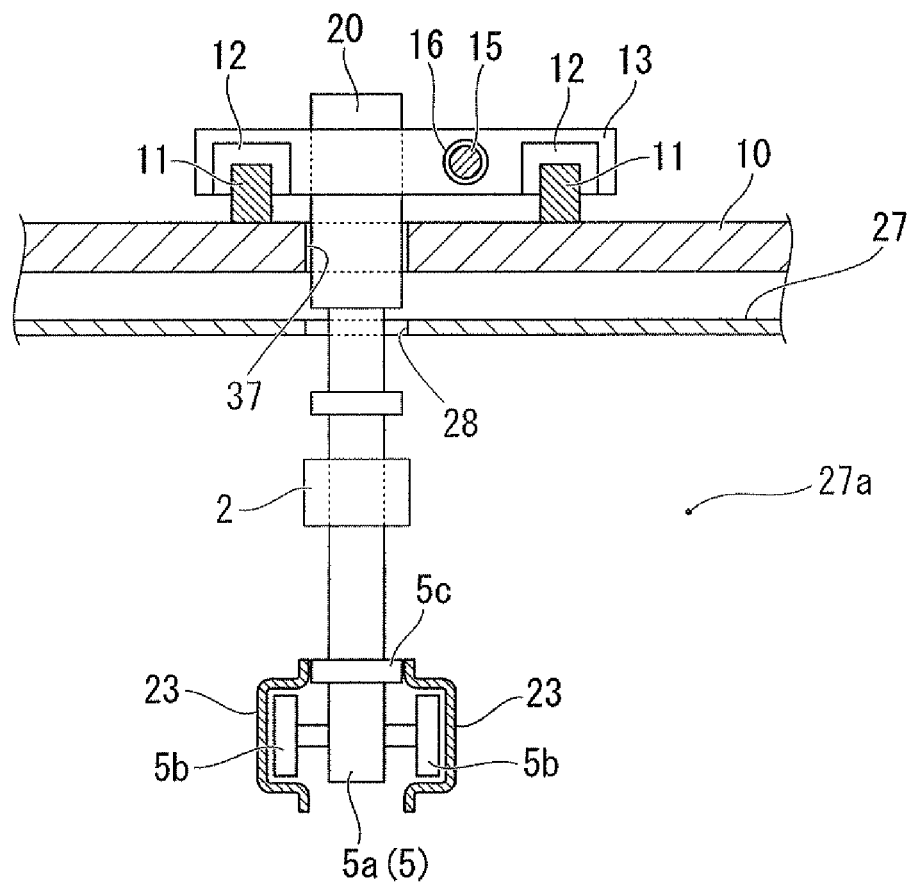
FIG. 6 is a cross-sectional view of FIG. 4 along line A-A.

Next, the synchronized carrying system and the synchronized carrying method according to the above embodiment of the present invention are described with reference to FIGS. 4-6. The base 10 of the carriage 1 is placed on the factory floor. An upper end of the trunnion pin 20 is rotatably engaged with (pivotally supported by) the front part of the base 10. Multiple wheels 10a are pivotally supported by both the front and rear sides of the base 10. When each of the connection nodes runs, the base 10 also runs by being led by the trunnion pin 20.

A pair of guide rails 23 is placed within the small space 27a beneath the factory floor so that the guide rails 23 face each other with a certain distance between them. The cross section of the guide rail 23 is roughly U-shaped. Trolley wheels 3b, 5b, 7b, and 9b, placed on both sides of the trolleys 3, 5, 7, and 9, run within each of these guide rails 23. FIG. 6 shows the passive trolley 5 as an example. The other trolleys 3, 7, and 9 are configured similarly.

The guide rollers 3c, 5c, 7c, and 9c of the trolleys 3, 5, 7, and 9 are placed so that the guide rollers are sandwiched between the upper ends of each of the guide rails 23. Each of these guide rollers 3c, 5c, 7c, and 9c comes in contact with the upper ends of each of the guide rails 23. Thus, the oscillation of each of the trolleys 3, 5, 7, and 9 is prevented.

Due to the phase switching unit 36 placed on the base 10, the position at which the trunnion pin 20 is engaged with respect to the base 10 can change in the front and rear directions along a long hole 37 formed on the base 10 along the direction of the work transportation.

The phase switching unit 36 includes a pair of guide rails 11, a pair of guide parts 12, and a slide part 13. The guide rail 11 extends along the direction of the work transportation which is placed on both sides of the long hole 37 on the upper side of the base 10, with the long hole 37 sandwiched by the guide rails. The guide part 12 engages with each of the guide rails so that the guide part can move in a longitudinal direction. The slide part 13 is supported by each of the guide parts 12. The upper end of the trunnion pin 20 engages with the slide part 13 via an axis receiving part 14. The upper end of the trunnion pin 20 runs through the long hole 37 from below the factory floor and sticks out above the base 10.

A rod screw 15 is pivotally supported by the base 10 so that the rod screw 15 is aligned with the long hole 37. This rod screw 15 connects with its female screw part 16 so that the rod screw 15 runs through the slide part 13 in the front-rear direction. A drive axis of an electric motor 17 is connected to the front end of the rod screw 15. The electric motor 17 is supported by the base 10. The electric motor 17 is connected, for example, via a belt-type power transmission mechanism 18. The electric motor 17 is driven and controlled by the control device 90. Because the electric motor 17 is driven, the rod screw 15 rotates via the power transmission mechanism 18. As a result, the slide part 13 changes its position, moving towards the front side and the back side.

A lifting unit 22 is placed in approximately the center of the base 10. The lifting unit 22 moves up and down due to a cylinder 21. A palette 50 is mounted on the lifting unit 22 at a predetermined location. This palette 50 positions the rear suspension assembly R and also loads the rear suspension assembly R.

The trolley wheels 3b, 5b, 7b, and 9b on both sides of each of the trolleys 3, 5, 7, and 9 of the carriage 1 run within a pair of guide rails 23. These guide rails 23 are laid out beneath the factory floor in the form of a loop from a top view. The trunnion pin 20, which sticks out below the base 10, and the guide roller 26 at the back side of the trunnion pin 20 run within the slit 28. This slit 28 is formed on the factory floor plane 27, which is in the form of a loop from a top view.

In other words, each of the guide rails 23, along with the slit 28, forms a transportation route which is in the form of a loop from a top view. The guide rail 25 of the floor-side chain conveyor 24 is laid out on the lower side (the bottom part of the small space 27a) of the guide rail 23 (refer to FIG. 3).

Next, the synchronized carrying system and the synchronized carrying method according to the above embodiment of the present invention are described with reference to FIG. 2. Each of the friction rollers 30 is placed immediately before the starting point 28b of the main line portion 28a of the slit 28, immediately after the end point 28c of the main line portion 28a, and other multiple locations. Thus, the friction conveyor 31 includes these friction rollers 30 and the return part 28d. As a result, the friction conveyor 31 can transport the carriage 1 with a greater velocity compared to the floor-side chain conveyor 24.

The floor-side chain conveyor 24 and the overhead conveyor 100 always operate in synchrony with each other due to methods such as pulse control. The pulse data of the floor-side chain conveyor 24 and the overhead conveyor 100 are inputted to the control device 90. The control device 90 obtains information concerning the position of the drive protrusion 102 which engages with the hanger 101 of the overhead conveyor 100. Thus, the control device obtains information concerning the position of the drive protrusion 24a which engages with the carriage 1 of the floor-side chain conveyor 24.

Next, the synchronized carrying system and the synchronized carrying method according to the above aspect of the present invention are described with reference to FIGS. 1-2. A first transferring unit 60 and a second transferring unit 70 are placed in a middle portion of the friction conveyor 31. The first transferring unit 60 transfers the palette 50 to the lifting unit 22 of the carriage 1. The rear suspension assembly R is loaded on the palette 50. The second transferring unit 70 ejects empty palettes 50 from the lifting unit 22 of the carriage 1. The first transferring unit 60 is placed in the down-stream side (a side toward the starting point 28b compared to the main line portion 28a) of the return unit 28d. The second transferring unit 70 is placed in the upstream side (a side towards the end point 28c compared to the main line portion 28a) of the return unit 28d. Thus, the first transferring unit 60 and the second transferring unit 70 are placed adjacent to each other.

A writing device 80 is placed near the second transferring unit 70. The writing device 80 enters information regarding vehicle types into a memory unit 1a of, for example, an ID plate equipped in the carriage 1. The writing device 80 is connected to the control device 90. The control device 90 successively overwrites information regarding vehicle types onto the memory unit 1a based on a production schedule transmitted from a production control computer (not diagrammed).

On the other hand, a memory unit 101a of, for example, an ID plate is also placed in the hanger 101. The hanger 101 is transported while dangling from the overhead conveyor 100. A writing device (not diagrammed) connected to the production control computer in an initial stage of the vehicle body assembling process enters into the memory unit 101a information of, for instance, the vehicle type and specifications of the vehicle body W loaded on the hanger 101. A reading device 100a is placed immediately before the rear suspension assembly loading process 200 and adjacent to the overhead conveyor 100. The reading device 100a reads information on vehicle types which was written into the memory unit 101a.

Next, an operation of the present invention is described.

First, the carriage 1 enters the return unit 28d from the rear suspension assembly loading process 200. Then, each of the friction rollers 30 is driven as necessary. The carriage 1 is then transported to the second transferring unit 70 at a comparatively high speed. The carriage 1 then stops. Further, the second transferring unit 70 ejects the empty palette 50 from the lifting unit 22 of the carriage 1. At the same time, the writing device 80 enters information concerning the vehicle type associated with the rear suspension assembly R, which will next be loaded to the lifting unit 22, into the memory unit 1a.

Next, each of the friction rollers 30 is driven as necessary. As a result, the carriage 1 is transported rapidly to the first transferring unit 60 and stops momentarily. The palette 50 is mounted at a predetermined position on the lifting unit 22 of the carriage 1 on the first transferring unit 60. The rear suspension assembly R is loaded on the palette 50.

Then, each of the friction rollers 30 is driven as necessary. The carriage 1 is transported at a high speed to a waiting position 40a located in front of (in the upstream side) the main line portion 28a of the return part 28d. The carriage 1 stops and waits at this waiting position 40a until the carriage 1 is sent to the main line portion 28a.

In other words, because each of the friction rollers 30 is driven individually, the friction conveyor 31 makes the carriage 1 run at an arbitrary velocity at an arbitrary location of the return unit 28d. The friction conveyor 31 also makes the carriage 1 stop. The friction conveyor 31 performs this operation independent of the overhead conveyor 100 and the floor-side chain conveyor 24 which is in synchrony with the overhead conveyor 100.

At this time, the electric motor 17 operates based on the information on vehicle types which was written in the memory unit 1a. The electric motor 17 is supported by the base 10. Because the rod screw 15 rotates, the slide part 13 and the trunnion pin 20 move along the guide rail 11 with respect to the base 10. As a result, the phase between the vehicle body W and the rear suspension assembly R is adjusted based on the above information concerning vehicle types.

In other words, the position of the trunnion pin 20 with respect to the base 10 changes in the direction of the work transportation. Thus, the relative positions of the passive projection 5d of the passive trolley 5 below the trunnion pin 20 and the rear suspension assembly R loaded on the base 10 change in the direction of the work transportation.

The relative positions of the drive projection 24a of the floor-side chain conveyor 24 and the vehicle body W loaded on the overhead conveyor 100 do not change. The floor-side chain conveyor 24 is in synchrony with the overhead conveyor 100. Instead, as described above, the relative positions of the passive projection 5d and the rear suspension assembly R change in the direction of the work transportation. In this way, it is possible to change the relative positions of the vehicle body W and the rear suspension assembly R in the direction of the work transportation. In other words, phase adjustment is made possible.

Thus, the relative positions of the vehicle body W, mounted on the hanger 101 of the overhead conveyor 100, and the rear suspension assembly R, mounted on the carriage 1, change in the direction of the work transportation while being transported synchronously during the rear suspension assembly loading process 200. As a result, it is possible to match the position at which the rear suspension assembly R is loaded on the vehicle body W (for example, a damper loading part and a bolt-hole) and the position of the rear suspension assembly R (for example, a part to which the damper is loaded and a bolt-hole) in the direction of the work transportation.

The control device 90 obtains from the pulse data, position information concerning the state immediately before the hanger 101 of the overhead conveyor 100 is brought into the rear suspension assembly loading process 200. Then, the control device 90 drives a first friction roller 30 located at the waiting position 40a. At the same time, the control device 90 drives a second friction roller 30 (including a third friction roller 30 located immediately before the starting point 28b of the main line portion 28a) located in the downstream side of the above first friction roller 30. The control device 90 then swiftly sends out the carriage 1, located at the waiting position 40a, to the transferring position 40b in the upstream side of the main line portion 28a.

At this time, the trunnion pin 20 of the carriage 1 and the passive projection 5d are located near the starting point 28b of the main line portion 28a. At this position, the passive projection 5d engages with the drive projection 24a of the floor-side chain conveyor 24. The floor-side chain conveyor 24 is in synchrony with the overhead conveyor 100. In other words, the control device 90 sends out the carriage 1 to the main line portion 28a when the control device 90 engages the passive projection 5d of the carriage 1 located at the waiting position 40a with the drive projection 24a of the floor-side chain conveyor 24 near the starting point 28b of the main line portion 28a.

Further, at this time, the reading device 100a placed immediately in front of the rear suspension assembly loading process 200 reads information on vehicle types which was written into the memory part 101a of the hanger 101. At the same time, the reading device 100a transmits this information to the control device 90. Then, the control device 90 compares the above information on vehicle types with the information on vehicle types where was written into the memory part 1a of the carriage 1 which was sent out to the main line portion 28a (in other words, the information on the vehicle type concerning the rear suspension assembly R which was loaded on the carriage 1).

When the above information on vehicle type matches, the hanger 101 of the overhead conveyor 100 is directly sent into the rear suspension assembly loading process 200. At the same time, the drive projection 24a of the floor-side chain conveyor 24 engages with the passive projection 5d of the carriage 1. The hanger 101 and the carriage 1 are then transported in synchrony. At this time, the position at which the rear suspension assembly R is loaded on the vehicle body W and the position of the rear suspension assembly R are different in the vertical direction but are the same from a top view.

The cylinder 21 of the carriage 1 is then extended, and the rear suspension assembly R is elevated along with the lifting part 22. This rear suspension assembly R is then placed in the position at which the rear suspension assembly R is loaded to the vehicle body W. As a result, it is possible to load the rear suspension assembly R to the vehicle body W.

After the rear suspension assembly R is loaded to the vehicle body W, the carriage 1 moves to the transferring position 40c in the downstream side of the main line portion 28a. Then, the passive projection 5d of the carriage 1 enters the main body part 5a of the passive trolley 5. Thus, the drive projection 24a of the floor-side chain conveyor 24 is disengaged from the passive projection 5d of the carriage 1. At this time, the hanger 101 of the overhead conveyor 100 is located where the hanger 101 was positioned immediately before the hanger 101 was carried out from the rear suspension assembly loading process 200.

At the same time, the passive projection 5*d* of the carriage 1 and the trunnion pin 20 are located at the branching point, from a top view, of the slit 28 of the factory floor 27 and the guide rail 25 of the floor-side chain conveyor 24 below the factory floor. In other words, the passive projection 5*d* and the trunnion pin 20 are located near the end point 28*c* of the main line portion 28*a*. After the above disengagement, the carriage 1 moves away from the floor-side conveyor 40. Thus, the carriage 1 moves towards the return part 28*d* of the slit 28.

The control device 90 obtains from the pulse data, position information concerning the state immediately before the hanger 101 of the overhead conveyor 100 is carried out from the rear suspension assembly loading process 200. Next, the control device 90 drives a friction roller 30 located immediately after the end point 28*c* of the main line portion 28*a* of the return part 28*d* of the friction conveyor 31. At the same time, the control device 90 drives another friction roller 30 which is located in the downstream side of the above friction roller and is also located in the upstream side of the second transferring unit 70. In this way, the control device 90 swiftly transports the carriage 1, which entered towards the side of the return part 28*d*, to the second transferring part 70. In other words, the control device 90 leads the carriage 1 into the return part 28*d* when the passive projection 5*d* of the carriage 1 is disengaged from the drive projection 24*a* of the floor-side chain conveyor 24.

The cycle described above is performed repeatedly according to the vehicle body W that is brought in. Thus, it is possible to continuously load the rear suspension assembly R to different types of the vehicle body W.

Incidentally, the information on vehicle types that is written into the memory part 101*a* of the hanger 101 may sometimes not match with the information on vehicle types that is written into the memory part 1*a* of the carriage 1. In such cases, the control device 90 stops each of the conveyors 40 and 100 in order to stop the rear suspension assembly loading process 200. At the same time, the control device 90 turns on a warning lamp 90*a* and an alarm unit 90*b*. In this way, the control device 90 informs that a malfunction has occurred. In this case, an operator takes complementary actions. For example, the operator might look at the vehicle body W and the rear suspension assembly R and check what types of vehicles they are associated with. Alternatively, when a simple data error has occurred, the operator might correct this error and restart the rear suspension assembly loading process 200. In other cases, when the vehicle types are in fact different, the operator might obtain the correct rear suspension assembly R and separately load the correct rear suspension assembly R to the vehicle body W.

As described above, the synchronized carrying system and the synchronized carrying method concerning underbody parts of the vehicle body according to the above embodiment include the overhead conveyor 100 which transports the vehicle body W; the floor-side conveyor 40 which transports the underbody part; and the control device 90 which operates and controls the overhead conveyor 100 and the floor-side conveyor 40 wherein: the overhead conveyor 100 and the floor-side conveyor 40 are in synchrony when the underbody part is loaded on the vehicle body W during the underbody part loading process 200; the floor-side conveyor 40 has a primary line portion 28*a* which is parallel to a work transportation of the overhead conveyor 100, a main route which is placed along a factory floor plane 27, a floor-side chain conveyor 24 and a friction conveyor 31 which transport the carrying device 1 along the main route, a secondary line portion 25*a* which is parallel to the main line portion 28*a* of the main route, a secondary route which is placed along the factory floor plane 27, an engaging part which engages with the carrying device that moves along the secondary route; the friction conveyor 31 has a return part 28*d* which connects a start point 28*b* and an end point 28*c* of the main line portion 28*a* of the main route, multiple friction rollers 30 which are placed on the return part 28*d*; the friction rollers 30 can operate individually and move the carrying device 1 by coming into contact with the carrying device 1; and the control device 90 controls the floor-side chain conveyor 24 and the overhead conveyor 100 in synchrony, controls the friction conveyor 31 so that the carrying device 1 stops and moves at a predetermined velocity at a predetermined location on the return part 28*d*, drives the friction roller 30 placed in an upstream side of the start point of the main line portion 28*a* and sends out the carrying device 1 to the main line portion 28*a* when the carrying device 1 stopped in the upstream side of the start point 28*b* of the main line portion 28*a* of the return part 28*d* engages with the engaging part of the floor-side chain conveyor 24 which is in synchrony with the overhead conveyor 100, moves the carrying device 1 engaged with the engaging part to the end point 28*c* of the main line portion 28*a*, and leads the carrying device 1 to the return part 28*d* by driving the friction roller 30 placed in a downstream side of the end point 28*c* of the main line portion 28*a* of the return part 28*d* when the carrying device 1 disengages from the engaging part at the end point 28*c* of the main line portion.

The synchronized carrying system and the synchronized carrying method according to the aspect of the present invention described above may also be configured so that, the carrying device 1 (carriage) circulates along the slit 28 along the factory floor 27 during the process of loading the rear suspension assembly R, which is transported by the floor-side conveyor 40, to the vehicle body W, which is transported by the overhead conveyor 100. At the same time, the carriage 1 engages with the drive projection 24*a*. Similar to the carriage 1, the drive projection 24*a* circulates along the guide rail 25 along the factory floor 27 in the main line portion 28*a* of the slit 28. Based on the configuration described above, it is possible to transport the overhead conveyor 100, on which the vehicle body W is loaded, and the rear suspension assembly R in synchrony. In other words, it is possible to lower the installation cost and the operation cost of the transportation device compared to a large-scale carriage returning device that elevates and lowers a carriage using an underground pit.

In addition, the carrying device 1 according to the above embodiment described above has a base 10 which loads the underbody part to a predetermined position, a trunnion pin 20 which sticks out from below the base 10 and engages with the main route to move along the main route, a phase switching unit 36 which is placed on the base 10 and changes a position of the trunnion pin 20 with respect to the base 10 in a direction of the work transportation, multiple node parts 2, 2*b*, 4, 6, 8, 8*b* which are connected to each other through multiple pins 2*a*, 6*a*, 8*a* as well as the trunnion pin 20, a receiving unit 35 which comprises continuous planes of the respective node parts 2, 2*b*, 4, 6, 8, 8*b* and receives a driving force of the friction roller 30 by coming into contact with the friction roller 30, and multiple trolleys 3, 5, 7, 9 each of which are supported by the respective pins 2*a*, 6*a*, 8*a*; and a passive projection is placed on the trolley 5 supported by the trunnion pin 20, the passive projection engaging with the engaging part of the floor-side chain conveyor 24.

Based on the synchronized carrying system and the synchronized carrying method according to the embodiment described above, when the carriage 1 engages with the drive projection 24a of the floor-side chain conveyor 24 which is in synchrony with the overhead conveyor 100, the position of the base 10 of the carriage 1 and the position of the rear suspension assembly R, which is mounted on the base 10 at a predetermined location, change in the direction of the work transportation with respect to the trunnion pin 20 and the drive projection 24a of the floor-side chain conveyor 24. Thus, it is possible to alter the position at which the rear suspension assembly R is loaded on the vehicle body W according to different vehicle types. Further, the phase switching unit 36 on the base 10 completes changing the relative positions of the base 10 and the trunnion pin 20. Thus, it is possible to reduce the complexity and the cost associated with dealing with a change in vehicle types.

The present invention is not limited to the embodiment described above. While the embodiment described above concerns loading the rear suspension assembly R to the vehicle body W, it is possible to apply the present invention, for example, to a procedure of loading underbody parts such as engine mission assembly and the like to the vehicle body W.

It should be understood that the embodiment of the present invention described above is exemplary of the invention and are not to be considered as limiting the present invention. Additions, omissions, substitutions, and other modifications can be made without departing from the spirit or scope of the present invention.

INDUSTRIAL APPLICABILITY

Based on the synchronized carrying system and the synchronized carrying method according to the aspect of the present invention described above, it is possible to transport in synchrony, an overhead conveyor carrying a vehicle body and a carriage carrying underbody parts. In other words, it is possible to lower the installation cost and the operating cost of the transportation device compared to a large-scale carriage returning device that elevates and lowers a carriage using an underground pit.

In addition, based on the synchronized carrying system and the synchronized carrying method according to the aspect of the present invention described above, it is possible to alter the position at which underbody parts are loaded to the vehicle body according to different vehicle types. Further, it is possible to reduce the complexity and the cost associated with dealing with the change in vehicle types.

DESCRIPTION OF REFERENCE SYMBOLS

1 Carrying device (carriage)
2 First node part
2a Front pin
2b Front node part
3 Front trolley
4 Second node part
5 Passive trolley
5d Passive projection (engaged portion)
6 Third node part
6a Connection pin
7 Load trolley
8 Fourth node part
8a Rear pin
8b Rear node part
9 Rear trolley
10 Base
20 Trunnion pin
24 Floor-side chain conveyor
24a Drive projection (engaging portion)
25 Guide rail (secondary route)
25a Secondary line portion
27 Factory floor plane (factory floor)
28 Slit (main route)
28a Main line portion
28b Start point
28c End point
28d Return portion
30 Friction roller
31 Friction conveyor
35 Receiving unit
36 Phase switching unit
40 Floor-side conveyor
90 Control device
100 Overhead conveyor
200 Rear suspension assembly loading process
W Vehicle body
R Rear suspension assembly (underbody part)

The invention claimed is:

1. A synchronized carrying system comprising:
an overhead conveyor which transports a vehicle body;
a floor-side conveyor which transports an underbody part;
a control device which operates and controls the overhead conveyor and the floor-side conveyor; and
a carrying device on which the underbody part is mounted, wherein:
the overhead conveyor and the floor-side conveyor are in synchrony when the underbody part is loaded to the vehicle body;
the floor-side conveyor has a main route structure which is placed along a factory floor plane, a main line portion of the main route structure parallel to a work transportation of the overhead conveyor, and a floor-side chain conveyor and a friction conveyor which transport the carrying device along the main route structure;
the floor-side chain conveyor has a secondary route structure which is placed along the factory floor plane, and a secondary line portion of the secondary route structure parallel to the main line portion of the main route structure, and engages with the carrying device that moves along the secondary route structure;
the friction conveyor has a return part which connects a start point and an end point of the main line portion of the main route structure, and multiple friction rollers which are placed on the return part;
the friction rollers can operate individually and move the carrying device by coming into contact with the carrying device;
the control device controls the floor-side chain conveyor and the overhead conveyor in synchrony, controls the friction conveyor so that the carrying device stops and moves at a predetermined velocity at a predetermined location on the return part, drives the friction roller placed in an upstream side of the start point of the main line portion and sends out the carrying device to the main line portion when the carrying device stopped in the upstream side of the start point of the main line portion of the return part engages with the floor-side chain conveyor which is in synchrony with the overhead conveyor, moves the carrying device engaged with the floor-side chain conveyor to the end point of the main line portion, and leads the carrying device to the return part by driving the friction roller placed in a downstream side of the end point of the main line portion of the return part when the carrying device disengages from the floor-side chain conveyor at the end point of the main line portion, the carrying device includes a base having a slot extending in a first direction, a trunnion pin and a phase switching device, the phase switching device is located on the base and is configured to change a position of the trunnion pin with respect to the base in the first direction, and the phase switching device includes a slide structure having a through hole and a rod screw inserting into the slide structure along the first direction, the trunnion pin passes through the through hole of the slide structure and the slot of the base, the slide structure is configured to slide in the first direction by rotation of the rod screw, such that the trunnion pin slides within the slot and in the first direction, thereby changing the position of the trunnion pin with respect to the base in the first direction.

2. The synchronized carrying system according to claim 1, wherein:

the base loads the underbody part to a predetermined position, the trunnion pin sticks out from below the base and engages with the floor-side chain conveyor, and the carrying device further includes: multiple node parts which are connected to each other through multiple pins including the trunnion pin, a receiving unit which comprises continuous planes of the respective node parts and receives a driving force of the friction roller by coming into contact with the friction roller, and multiple trolleys each of which are supported by the respective pins; and a passive projection is placed on the respective trolleys supported by the respective pins, the passive projection engaging with the floor-side chain conveyor.

3. A synchronized carrying system comprising:

an overhead conveyor which transports a vehicle body; and a floor-side conveyor which is controlled to be in synchrony with the overhead conveyor and transports an underbody part, wherein:

the floor-side conveyor has a main route structure which is placed along a factory floor plane, a floor-side chain conveyor and a friction conveyor which moves along the main route structure a carrying device carrying the underbody part, and a secondary route structure which is placed along the factory floor plane;

the main route structure has a main line portion which is parallel to a direction in which the overhead conveyor transports the vehicle body, and a return part which connects a start point and an end point of the main line portion;

the secondary route structure has a secondary line portion which is parallel to the main line portion;

the floor-side chain conveyor is engagable with the carrying device to move along the secondary route structure;

the friction conveyor has multiple friction rollers which are placed on the return part, moves the carrying device by coming into contact with the carrying device, and can be driven individually;

the carrying device includes a base having a slot extending in a first direction, a trunnion pin and a phase switching device, the phase switching device is located on the base and is configured to change a position of the trunnion pin with respect to the base in the first direction, and the phase switching device includes a slide structure having a through hole and a rod screw inserting into the slide structure along the first direction, the trunnion pin passes through the through hole of the slide structure and the slot of the base, the slide structure is configured to slide in the first direction by rotation of the rod screw, such that the trunnion pin slides within the slot and in the first direction, thereby changing the position of the trunnion pin with respect to the base in the first direction.

4. A synchronized carrying method using the synchronized carrying system according to claim 3, comprising:

driving the friction roller placed in an upstream side of the start point and sending out the carrying device to the main line portion when the carrying device stopped in the upstream side of the start point of the main line portion engages with the floor-side chain conveyor;

using the floor-side chain conveyor which is in synchrony with the overhead conveyor and moving the carrying device engaged with the floor-side chain conveyor from the start point of the main line portion to the end point; and sending the carrying device to the return part by driving the friction roller placed in a downstream side of the end point when the carrying device disengages from the floor-side chain conveyor at the end point of the main line portion.

* * * * *